United States Patent [19]

Kuromitsu

[11] Patent Number: 4,781,026
[45] Date of Patent: Nov. 1, 1988

[54] FLUID PRESSURE BRAKE BOOSTER FOR MOTOR VEHICLES

[75] Inventor: Hiromu Kuromitsu, Chiryu, Japan

[73] Assignee: Aisin Seiki Kabushiki Kaisha, Kariya, Japan

[21] Appl. No.: 22,602

[22] Filed: Mar. 4, 1987

Related U.S. Application Data

[63] Continuation of Ser. No. 680,565, Dec. 11, 1984, abandoned.

[30] Foreign Application Priority Data

Mar. 22, 1984 [JP] Japan ................................. 59-55657

[51] Int. Cl.⁴ .............................................. B60T 13/00
[52] U.S. Cl. ....................................... 60/547.1; 60/588
[58] Field of Search ...................... 60/547.1, 548, 553; 251/282

[56] References Cited

U.S. PATENT DOCUMENTS

| 4,263,784 | 4/1981 | Steffes | 60/547.1 |
| 4,338,855 | 7/1982 | Ideta | 60/547.1 |
| 4,341,076 | 7/1982 | Steffes | 60/547.1 |
| 4,433,543 | 2/1984 | Thomas et al. | 60/547.1 |
| 4,441,319 | 4/1984 | Brown | 60/548 |
| 4,490,977 | 1/1985 | Fulmer | 60/547.1 |

FOREIGN PATENT DOCUMENTS

| 138462 | 8/1982 | Japan | 60/547.1 |
| 57-198157 | 12/1982 | Japan . | |

*Primary Examiner*—Abraham Hershkovitz
*Attorney, Agent, or Firm*—Oblon, Fisher, Spivak, McClelland & Maier

[57] ABSTRACT

A piston for acting on both a master cylinder and a fluid pressure booster is slidably disposed in a housing and defines a pressure buildup chamber communicating with a wheel brake actuating cylinder on one end and a power chamber on an opposite end. The cylinder has a plurality of axial slots defined in an outer peripheral surface thereof and communicating with inlet, supply, and outlet ports, there being seals disposed in the axial slots.

6 Claims, 4 Drawing Sheets

FLUID PRESSURE BRAKE BOOSTER FOR MOTOR VEHICLES

This application is a continuation of application Ser. No. 680,565, filed on Dec. 11, 1984, now abandoned.

BACKGROUND OF THE INVENTION

1. Field of the Invention:

The present invention relates to a fluid pressure brake booster for use in motor vehicles.

2. Description of the Prior Art:

Brakes for use in motor vehicles include a fluid pressure brake booster for assisting the brake in producing increased braking power when the brake is actuated. One conventional fluid pressure brake booster, as disclosed in Japanese Laid-Open Patent Publication No. 57-198157, includes an accumulator for storing a fluid pressure for selective use, the accumulator being held in communication with a booster housing, and a valve device actuatable for controlling fluid communication from the accumulator to a power chamber to allow a fluid pressure to act on a piston in the power chamber for thereby forcing the fluid from the booster housing into a braking circuit.

With the conventional fluid pressure brake booster, a master cylinder and the booster housing are of an integral construction with equal cylinder diameters. The pistons in the master cylinder and booster have annular grooves defined in outer peripheral surfaces thereof and communicating respectively with a reservoir and the accumulator. The formation of the annular grooves in the pistons however is disadvantageous in that the fluid pressure brake booster is axially elongated in overall construction.

SUMMARY OF THE INVENTION

It is an object of the present invention to provide a fluid pressure brake booster having a reduced axial length with no annular grooves defined in a piston.

According to the present invention, a piston for acting on both a master cylinder and a fluid pressure booster is slidably disposed in a housing and defines a pressure buildup chamber communicating with a wheel brake actuating cylinder on one end and a power chamber on an opposite end. The piston has a plurality of axial slots defined in an outer peripheral surface thereof and communicating with inlet, supply, and outlet ports, there being seals disposed in the axial slots.

One of the axial slots communicates with a pressure source for being supplied with a fluid under pressure therefrom, another axial slot with a reservoir for the master cylinder, and the other axial slots with a reservoir of the pressure source. When a fluid under pressure is introduced into the power chamber when an input piston is actuated, the piston is moved to supply the fluid under pressure from the pressure buildup chamber into the wheel brake actuating cylinder. When the brake is not in operation, the pressure buildup chamber and the reservoir for the master cylinder are in communication with each other through a port in one of the slots. When the brake is operated, the pressure buildup chamber and the for the master cylinder are brought out of communiation by a seal. The overall length of the brake booster would be increased by increasing the inside diameter of the master cylinder to reduce the stroke of the piston therein. However, the present invention is more advantageous than such an alternative arrangement for the following reasons:

(1) As is well known, the wall thickness of a tubular body has to be commensurate with the inside diameter thereof for giving a desired pressure-withstanding strength to the tubular body. The wall thickness of the cylinder of the invention may be smaller under maximum pressure.

(2) Where the master cylinder had a large diameter, the rate of a pressure buildup in the pressure buildup chamber per unit piston displacement would be increased, and if the interval between a compensating port and a cup seal varied uniformly upon return of the piston, the master cylinder would be subjected to a pressure buildup before the cup seal would move past the compensating port, with the result that the cup seal would enter the port and be scuffed. With the present invention, however, no such a problem takes plate, and the cup seal will be of an increased degree of durability.

(3) With the foregoing alternative arrangement, upon a pressure source failure, the leverage ratio at a brake pedal would have to be increased in order to produce a prescribed braking pressure with a prescribed brake depressing force. This would impose an increased load on a pivot joint between the brake pedal and an input piston, resulting in a greater frictional loss so as to lower the efficiency of brake depressing force and increase wear on the related parts.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
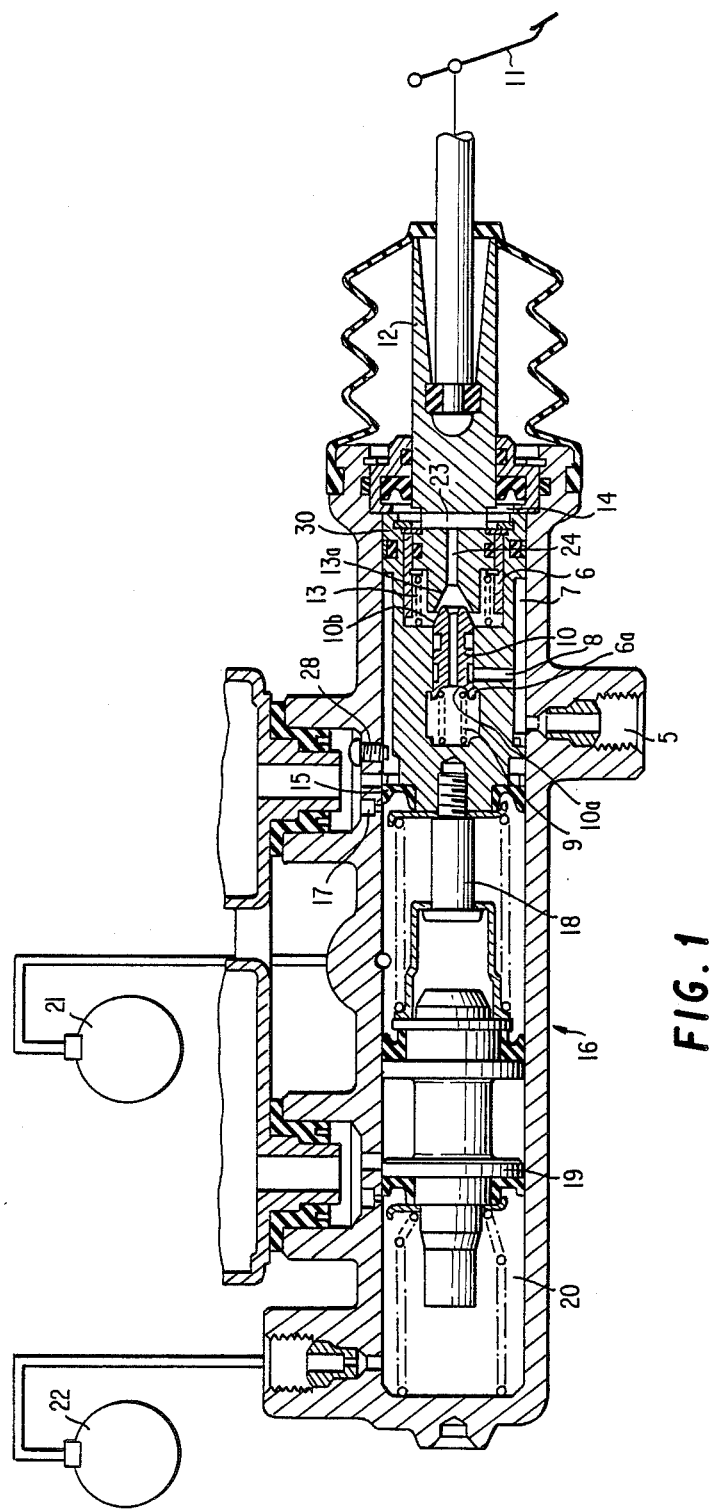
FIG. 1 is a longitudinally cross-sectional view, taken along line I—I of FIG. 3, of a fluid pressure brake booster according to the present invention.
Figure 2:
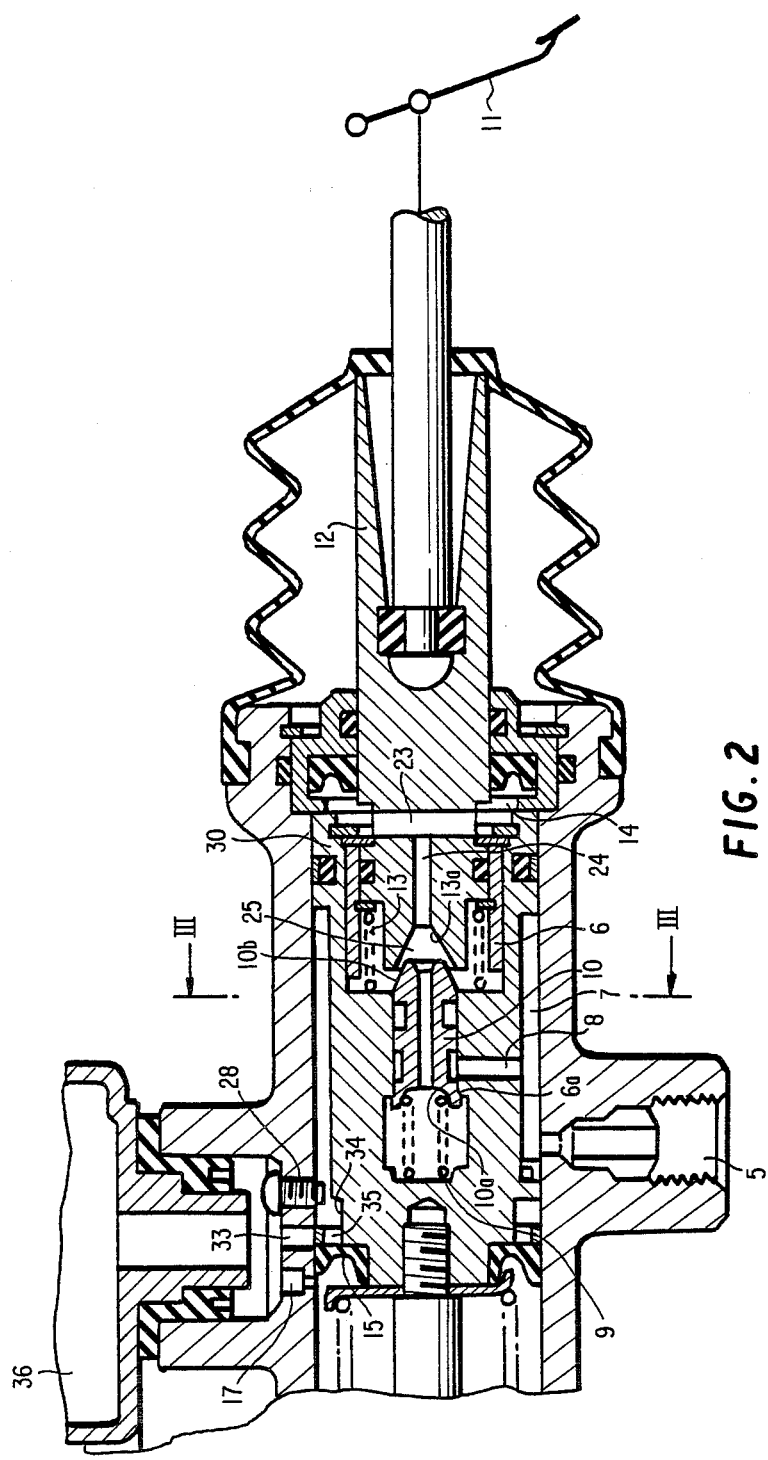
FIG. 2 is a fragmentary enlarged cross-sectional view of the fluid pressure brake booster of FIG. 1.
Figure 3:
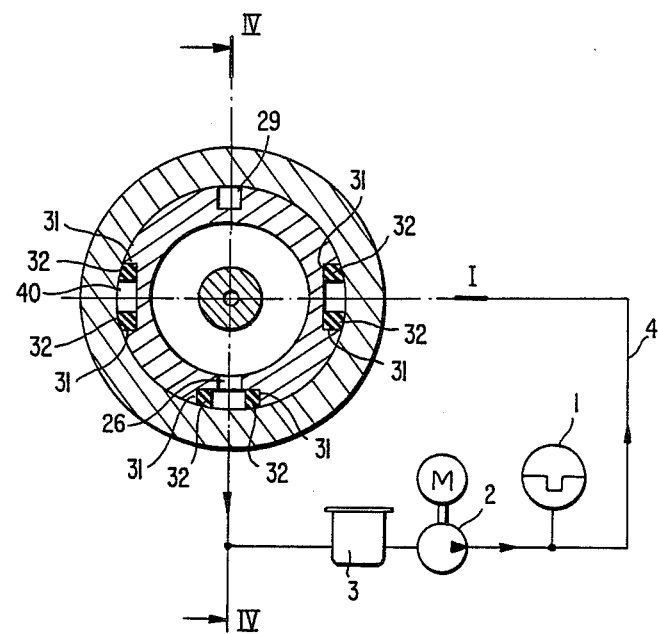
FIG. 3 is a cross-sectional view taken along line III—III of FIG. 2.
Figure 4:
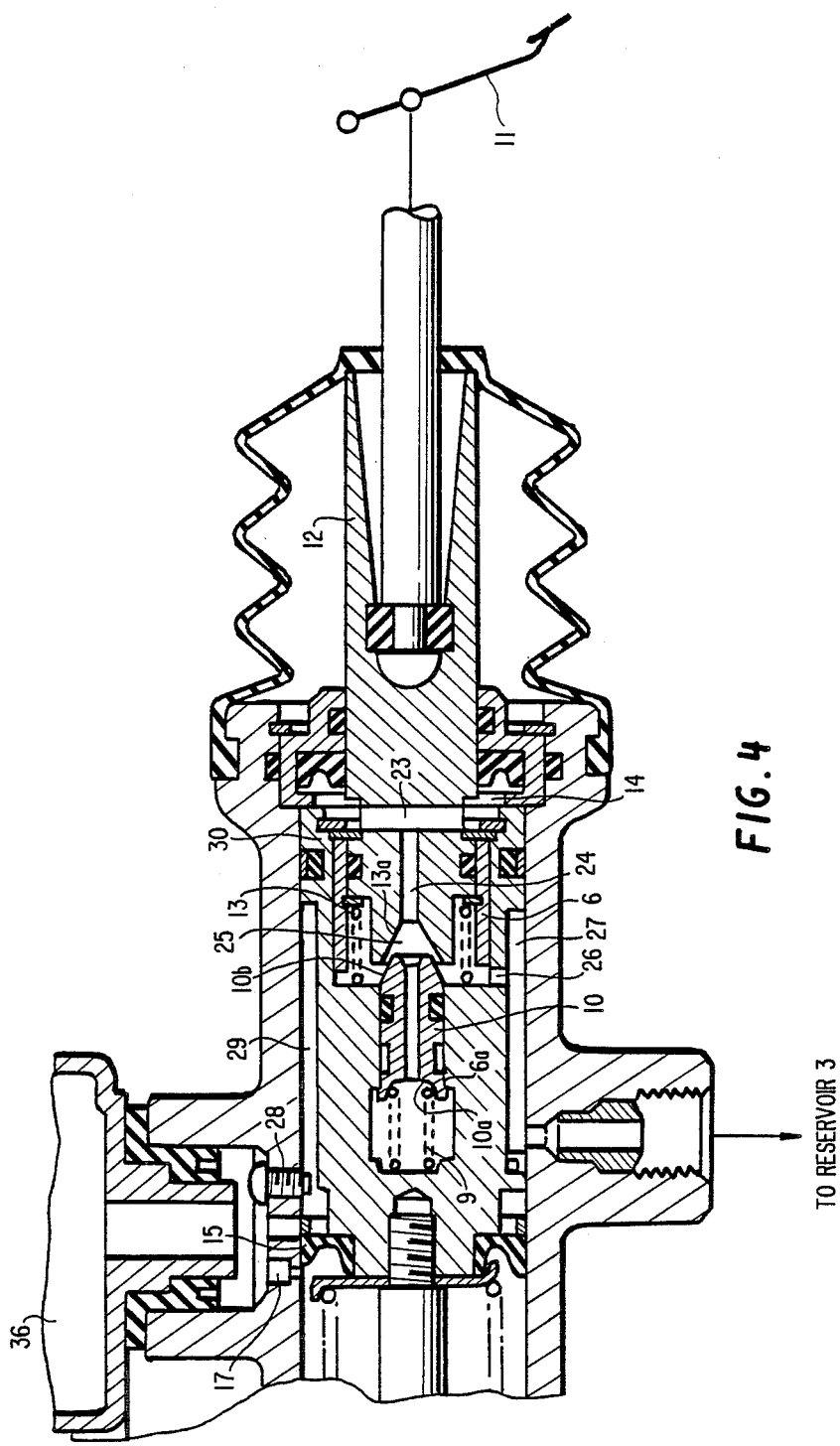
FIG. 4 is a cross-sectional view taken along line IV—IV of FIG. 3.

As shown in FIG. 3, an accumulator 1 stores oil under pressure drawn by a pump 2 from a reservoir 3 serving as a source of fluid pressure. The oil under pressure is delivered through a conduit 4 and a port 5 (FIGS. 1, 2 and 4) into a slot 7 defined in an outer periphery of a piston 6. The oil under pressure is then delivered through a passage 8 in the piston 6 and borne by a valve body 10a of a control valve 10 loaded by a spring 9 and a valve seat 6a of the piston 6 for the valve body 10a.

When a brake pedal 11 is depressed by the driver, an input piston 12 is moved to the left against the force of a spring 13 to bring a valve seat 13a of the input piston 12 into sealing abutment against a valve body 10b of the control valve 10 whereupon the reservoir 3 is disconnected from a power chamber 14. As the brake pedal 11 is further depressed, the valve body 10a is unseated off the valve seat 6a, and the oil under pressure from the accumulator 1 is introduced into the power chamber 14 to move the piston 6 to the left. A cup seal 15 mounted on the lefthand end of the piston 6 closes a port 17 in a master cylinder 16 to increase the pressure in a first chamber 18 in the master cylinder 16. A piston 19 is pushed by the pressure buildup in the first chamber 18 to increase the pressure in a second chamber 20 in the master cylinder 16. Thus, the fluid pressures in wheel brake actuating cylinders 21, 22 communicating respectively with the first and second chambers 18, 20 are increased.

When the driver releases the brake pedal 11, the input piston 12 is moved to the right to allow the valve body 10a to be seated on the valve seat 6a, and then allow the valve seat 13a to be separated from the valve body 10b. The oil in the power chamber 14 now returns through passages 23, 24, a chamber 25, a passage 26, and a slot 27 in an outer periphery of the piston 6 into the reservoir 3, whereupon the piston 6 moves to the right. Therefore, the fluid pressures in the first and second chambers 18, 20 are reduced to cause a pressure reduction in the wheel brake actuating cylinders 21, 22, thus releasing the brakes. When the first chamber 18 is subjected to a negative pressure at this time, the oil from the reservoir 3 is drawn through a supply port 33, an annular groove 34, a hole 35, and around the cup seal 15 into the first chamber 18. Seals 31 are disposed in the slot 7 supplied with the fluid under pressure from the accumulator 1 and also in the slot 27 communicating with the reservoir 3. These seals 31 are effective in sealing any gas leakage from the accumulator 1. The seals 31 are kept expanded by holders 32. A slot 29 in the piston 6 is held in communication with a reservoir for the master cylinder 16.

The piston 6 is locked against rotation by a stop screw 28 projecting into the slot 29. A sleeve 30 is disposed around the input piston 12. The sleeve 30 is moved to the left against the bias of the spring 13 when the fluid pressure in the power chamber 14 is equalized to the biasing force F of the spring as divided by the annular cross-sectional area of the sleeve 30, thus preventing the spring force from acting on the input piston 12.

Although a certain preferred embodiment has been shown and described, it should be understood that many changes and modifications may be made therein without departing from the scope of the appended claims.

What is claimed is:

1. A fluid pressure brake booster for use in a motor vehicle, comprising:
   (a) an accumulator for storing a working fluid under pressure supplied by a pump from a reservoir;
   (b) a housing having an inlet port for introducing the working fluid stored in said accumulator and an outlet port for returning the working fluid into said reservoir;
   (c) a piston slidably fitted in a cylinder bore in said housing;
   (d) a pressure buildup chamber defined by said piston in said housing on one side of said piston and held in fluid communication with a wheel brake actuating cylinder;
   (e) a power chamber defined by said piston in said housing on an opposite side of said piston;
   (f) a manually operated control valve for normally keeping said power chamber out of communication with said inlet port and in communication with said outlet port, said manually operated control valve being responsive to a depression of a brake pedal operatively coupled therewith for bringing said power chamber out of communication with said outlet port and in communication with said inlet port;
   (g) said housing having a compensating port held in communication with a reservoir for a master cylinder and positioned so that it will be out of communication with said pressure buildup chamber by a cup seal mounted on an end of said piston when the latter is actuated, and a supply port for introducing a brake fluid from said reservoir for said master cylinder into said pressure buildup chamber from behind said cup seal and around the cup seal;
   (h) said piston having in an outer peripheral surface thereof a first axial slot communicating with said inlet port for guiding the working fluid from said inlet port to said control valve, a second axial slot communicating with said supply port, and a third axial slot communicating with said outlet port for guiding the working fluid from said control valve to said outlet port wherein said first, second and third axial slots are respectively located in a same predetermined axial plane on the axis of said piston; and
   (i) a plurality of seals disposed respectively in said first and third axial slots for preventing the working fluid from leaking from said first and third axial slots to said second axial slot in between said piston and said housing.

2. A fluid pressure brake booster according to claim 1, wherein said accumulator comprises a hydropneumatic accumulator.

3. A fluid pressure brake booster according to claim 1, wherein said second and third axial slots are positioned in diametrically opposite relation to each other across said axis of the piston.

4. A fluid pressure brake booster according to claim 2, wherein said second and third axial slots are positioned in diametrically opposite relation to each other across an axis of the piston.

5. A fluid pressure brake booster according to claim 1, including a rotation prevention member fixed to said housing and having a distal end slidably fitted in said second axial slot for preventing said piston from being rotated.

6. A fluid pressure brake booster according to claim 4, including a rotation prevention member fixed to said housing and having a distal end slidably fitted in said second axial slot for preventing said piston from being rotated.

* * * * *